US012401149B2

(12) United States Patent
Morello et al.

(10) Patent No.: US 12,401,149 B2
(45) **Date of Patent: *Aug. 26, 2025**

(54) ELECTRICAL CONNECTOR ASSEMBLY WITH COIL SPRING TERMINAL

(71) Applicant: Aptiv Technologies AG, Schaffhausen (CH)

(72) Inventors: John R. Morello, Warren, OH (US); James M. Rainey, Warren, OH (US); Joon Lee, Carmel, IN (US); Michael Messuri, Canfield, OH (US)

(73) Assignee: Aptiv Technologies AG, Schaffhausen (CH)

( * ) Notice: Subject to any disclaimer, the term of this patent is extended or adjusted under 35 U.S.C. 154(b) by 455 days.

This patent is subject to a terminal disclaimer.

(21) Appl. No.: 17/888,978

(22) Filed: Aug. 16, 2022

(65) Prior Publication Data

US 2024/0063568 A1 Feb. 22, 2024

(51) Int. Cl.
*H01R 13/187* (2006.01)
*H01R 13/11* (2006.01)
*H01R 13/24* (2006.01)

(52) U.S. Cl.
CPC ......... *H01R 13/187* (2013.01); *H01R 13/111* (2013.01); *H01R 13/2421* (2013.01)

(58) Field of Classification Search
CPC ................ H01R 13/187; H01R 13/111; H01R 13/2421; H01R 13/15; H01R 13/17; H01R 13/2471
See application file for complete search history.

(56) References Cited

U.S. PATENT DOCUMENTS

| | | | | |
|---|---|---|---|---|
| 3,200,365 | A * | 8/1965 | Carpinone | H01R 13/15 439/473 |
| 5,906,520 | A * | 5/1999 | Frinker | H01R 13/2421 439/841 |
| 6,190,181 | B1 * | 2/2001 | Affolter | H01R 13/2421 439/70 |
| 7,429,199 | B2 | 9/2008 | Burgess | |
| 7,972,173 | B1 * | 7/2011 | Hyzin | H01R 13/6583 439/700 |
| 8,066,520 | B2 | 11/2011 | Lenfert et al. | |
| 11,509,087 | B1 * | 11/2022 | Capitelli | H01R 13/2421 |
| 2007/0232154 | A1 | 10/2007 | Zhao et al. | |
| 2023/0058577 | A1 * | 2/2023 | Hagiwara | H01R 13/2421 |
| 2024/0063567 | A1 * | 2/2024 | Morello | H01R 13/15 |

FOREIGN PATENT DOCUMENTS

AU 2020200606 A1 8/2021

* cited by examiner

*Primary Examiner* — Renee S Luebke
*Assistant Examiner* — Paul D Baillargeon
(74) *Attorney, Agent, or Firm* — Billion & Armitage

(57) ABSTRACT

An electrical connector assembly includes an electrical receptacle terminal configured to receive a corresponding electrical plug terminal therein. The electrical receptacle terminal has a helical coil spring. The electrical connector assembly further includes a cable terminal attached to an end of a conductor of an electrical cable. The coil spring is in compressive contact with the cable terminal.

15 Claims, 8 Drawing Sheets

ELECTRICAL CONNECTOR ASSEMBLY WITH COIL SPRING TERMINAL

TECHNICAL FIELD

This application is directed to an electrical connector assembly that includes a coil spring electrical terminal.

BACKGROUND

Electrical receptacle terminals are typically manufactured from sheet metal using a stamping process and folding process. These receptacle terminals can stub against a mating electrical plug terminal when they are connected if the receptable and plug terminals are not carefully aligned, especially with smaller terminals used to terminate inner conductors of coaxial cables. Therefore, tools to properly orient the receptacle and plug terminals may be required for such terminals. Typically, the receptacle and plug terminals require some overtravel to make the connection, thus requiring more packaging space for a connector assembly using these terminals. Electrical terminals incorporating coil springs usually are not known to use the spring as a contact in an axial application.

BRIEF SUMMARY

According to one or more aspects of the present disclosure, an electrical connector assembly includes an electrical receptacle terminal configured to receive a corresponding electrical plug terminal therein. The electrical receptacle terminal has a helical coil spring. The electrical connector assembly also includes a cable terminal attached to an end of a conductor of an electrical cable. The coil spring is in compressive contact with the cable terminal.

In one or more embodiments of the electrical connector assembly according to the previous paragraph, the cable terminal defines a spherical sector shaped electrical contact in compressive mechanical contact with the coil spring.

According to one or more aspects of the present disclosure, an electrical connector assembly includes an electrical receptacle terminal having a helical coil spring configured to receive a corresponding electrical plug terminal therein and an insulative housing having a cavity in which the receptacle terminal is disposed.

In one or more embodiments of the electrical connector assembly according to the previous paragraph, a first end of the coil spring has a first portion of the coil spring proximate the first end that is configured to receive the electrical plug terminal and provide a plurality of electrical contact points between the coil spring and the electrical plug terminal.

In one or more embodiments of the electrical connector assembly according to any one of the previous paragraphs, a diameter of coils of the coil spring in the first portion of the coil spring is less than a diameter of coils in the coils spring at the first end.

In one or more embodiments of the electrical connector assembly according to any one of the previous paragraphs, a second end of the coil spring opposite the first end is in compressive mechanical contact with a cable terminal attached to an end of a conductor of an electrical cable.

In one or more embodiments of the electrical connector assembly according to any one of the previous paragraphs, the cable terminal defines a spherical sector shaped electrical contact in compressive mechanical contact with the second end of the electrical receptacle terminal.

In one or more embodiments of the electrical connector assembly according to any one of the previous paragraphs, a longitudinal axis of the electrical cable is arranged generally perpendicularly to a longitudinal axis of the coil spring.

In one or more embodiments of the electrical connector assembly according to any one of the previous paragraphs, coils of the coil spring in a second portion of the coil spring outside of the electrically conductive sleeve are touching one another when the coil spring is in a relaxed condition.

In one or more embodiments of the electrical connector assembly according to any one of the previous paragraphs, the electrically conductive sleeve defines a tab feature configured to retain the electrically conductive sleeve and the coil spring within the cavity.

In one or more embodiments of the electrical connector assembly according to any one of the previous paragraphs, the coil spring is a first coil spring. The assembly further includes a second coil spring that is partially disposed within the electrically conductive sleeve and in compressive mechanical contact with a cable terminal attached to an end of a conductor of an electrical cable.

In one or more embodiments of the electrical connector assembly according to any one of the previous paragraphs, coils of the second coil spring outside of the electrically conductive sleeve are touching one another when the coil spring is in a relaxed condition.

According to one or more aspects of the present disclosure, an electrical connector assembly includes an electrical receptacle terminal configured to receive a corresponding electrical plug terminal therein, a cable terminal attached to an end of a conductor of an electrical cable, a coil spring having a first end attached to the electrical receptacle terminal a second end in compressive mechanical contact with the cable terminal, and an insulative housing having a cavity in which the receptacle terminal and coil spring are disposed.

In one or more embodiments of the electrical connector assembly according to the previous paragraph, coils of the coil spring located proximate the second end are touching one another when the coil spring is in a relaxed condition.

In one or more embodiments of the electrical connector assembly according to any one of the previous paragraphs, a portion of the receptacle terminal is disposed within a first portion of the coil spring. Coils of the coil spring in a second portion of the coil spring in which the electrical receptacle terminal is not disposed are touching one another when the coil spring is in a relaxed condition.

In one or more embodiments of the electrical connector assembly according to any one of the previous paragraphs, the portion of the electrical receptacle terminal received within the coil spring is rod-shaped.

In one or more embodiments of the electrical connector assembly according to any one of the previous paragraphs, the cable terminal defines a spherical sector shaped electrical contact.

In one or more embodiments of the electrical connector assembly according to any one of the previous paragraphs, the cable terminal is an electrically conductive sphere attached to the end of a conductor of an electrical cable.

In one or more embodiments of the electrical connector assembly according to any one of the previous paragraphs, the first end of the coil spring is in compressive contact with rod-shaped portion of the electrical receptacle terminal.

BRIEF DESCRIPTION OF THE DRAWINGS

The present invention will now be described by way of example with reference to the accompanying drawings, in which.

DETAILED DESCRIPTION

Figure 1:
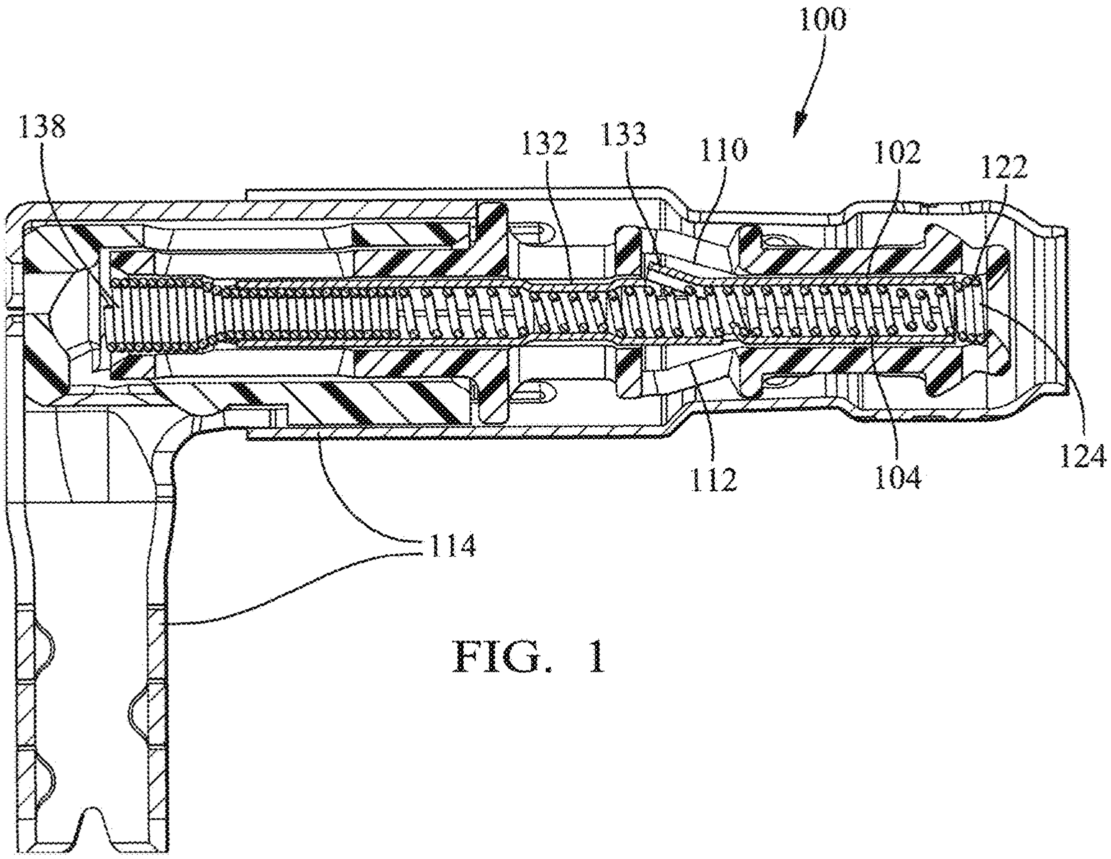
FIG. 1 shows a cross-section view of an electrical connector assembly with an electrical receptacle terminal having a helical coil spring configured to receive a corresponding electrical plug terminal according to some embodiments.

FIGS. 1-7 show a first non-limiting example of a right-angled electrical connector assembly, hereafter referred to as the assembly 100. The assembly 100 includes an electrical receptacle terminal 102 in the form of a helical coil spring 104 that is configured to receive a corresponding electrical plug terminal 106, shown here in the form of a cylindrical pin, of a mating electrical connector assembly 108. The electrical receptacle terminal 102 is disposed within a cavity 110 of an insulative housing 112 which is surrounded by an electrical shield terminal 114. The electrical receptacle terminal 102 is configured to terminate a central conductor 116 of an electrical cable 118 and the electrical shield terminal 114 terminates a shield conductor 120 of the electrical cable 118. In the present embodiment, the electrical cable 118 is a coaxial cable.

Figure 2:
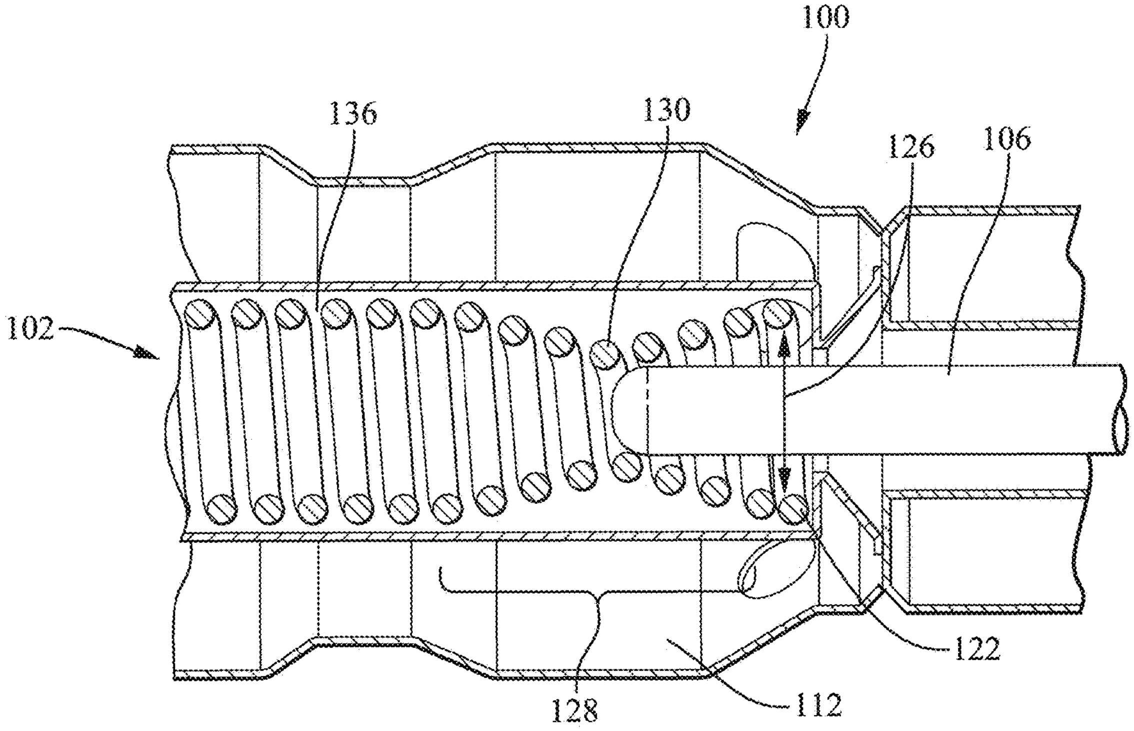
FIG. 2 shows a close up cross-section view of the interface between the helical coil spring of the electrical receptacle terminal of FIG. 1 and the corresponding electrical plug terminal according to some embodiments.

As best shown in FIG. 2, a first end 122 of the coil spring 104 has an opening 124 with a first diameter 126. A first portion 128 of the coil spring 104 near the first end 122 has a second diameter 130 that is reduced from, i.e., smaller than, the first diameter 126. This first portion 128 is configured to provide compressive contact between the receptacle terminal 102 and the corresponding plug terminal 106. The coil spring 104 not only provides a compressive contact force between the receptacle and plug terminals 102, 106, the turns of the coil spring 104 also provide a plurality of redundant contact points between the receptacle and plug terminals 102, 106, thereby improving the robustness of the electrical connection between the receptacle and plug terminals 102, 106.

Figure 3:
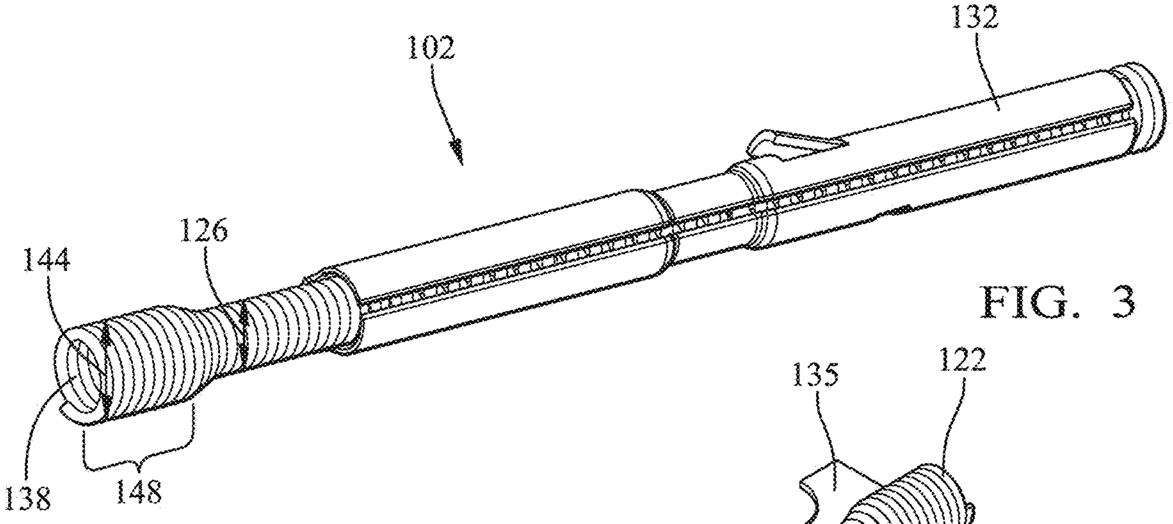
FIG. 3 shows a perspective view of the helical coil spring of the electrical receptacle terminal of FIG. 1 within an electrically conductive sleeve according to some embodiments.
Figure 4A:
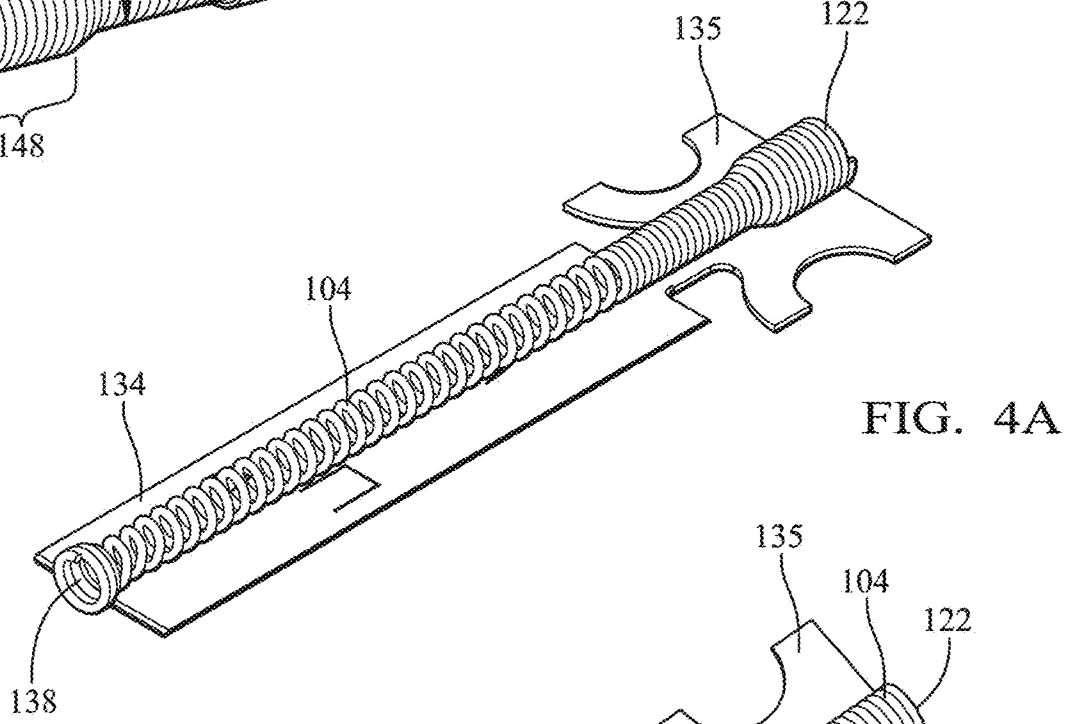
FIGS. 4A and 4B show various steps in a process of forming the electrically conductive sleeve of FIG. 3 around the helical coil spring according to some embodiments.
Figure 4B:
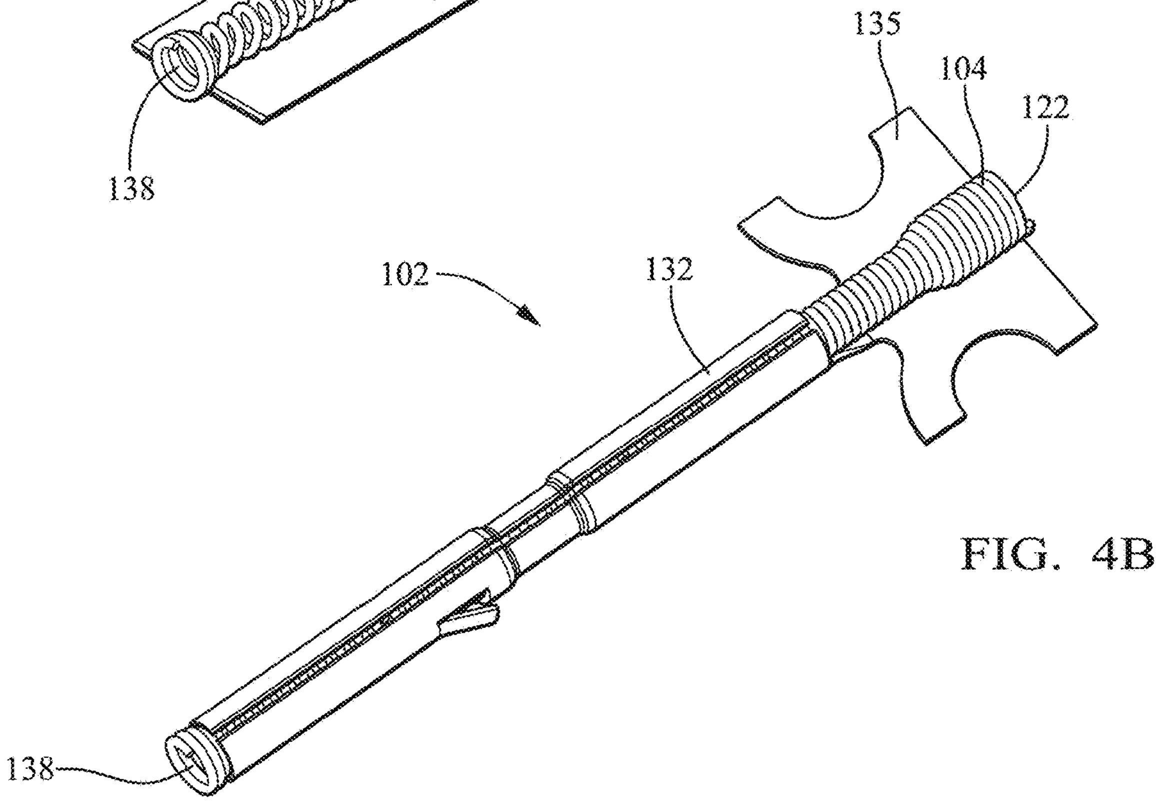

As shown in FIG. 3, the first portion 128 of the coil spring 104 is contained within a conductive sleeve 132 that is at least partially radially wrapped around the first portion 128. FIGS. 4A and 4B illustrate a process of forming conductive sleeve 132 from a terminal preform 134 stamped from flat sheet metal as shown in FIG. 4A and then rolled around the coil spring 104 to form the conductive sleeve 132 in FIG. 4B. This conductive sleeve 132 improves the electromagnetic performance of the receptacle terminal 102 by covering the gaps 136 in the coil spring in and around the first portion 128.

Figure 5:
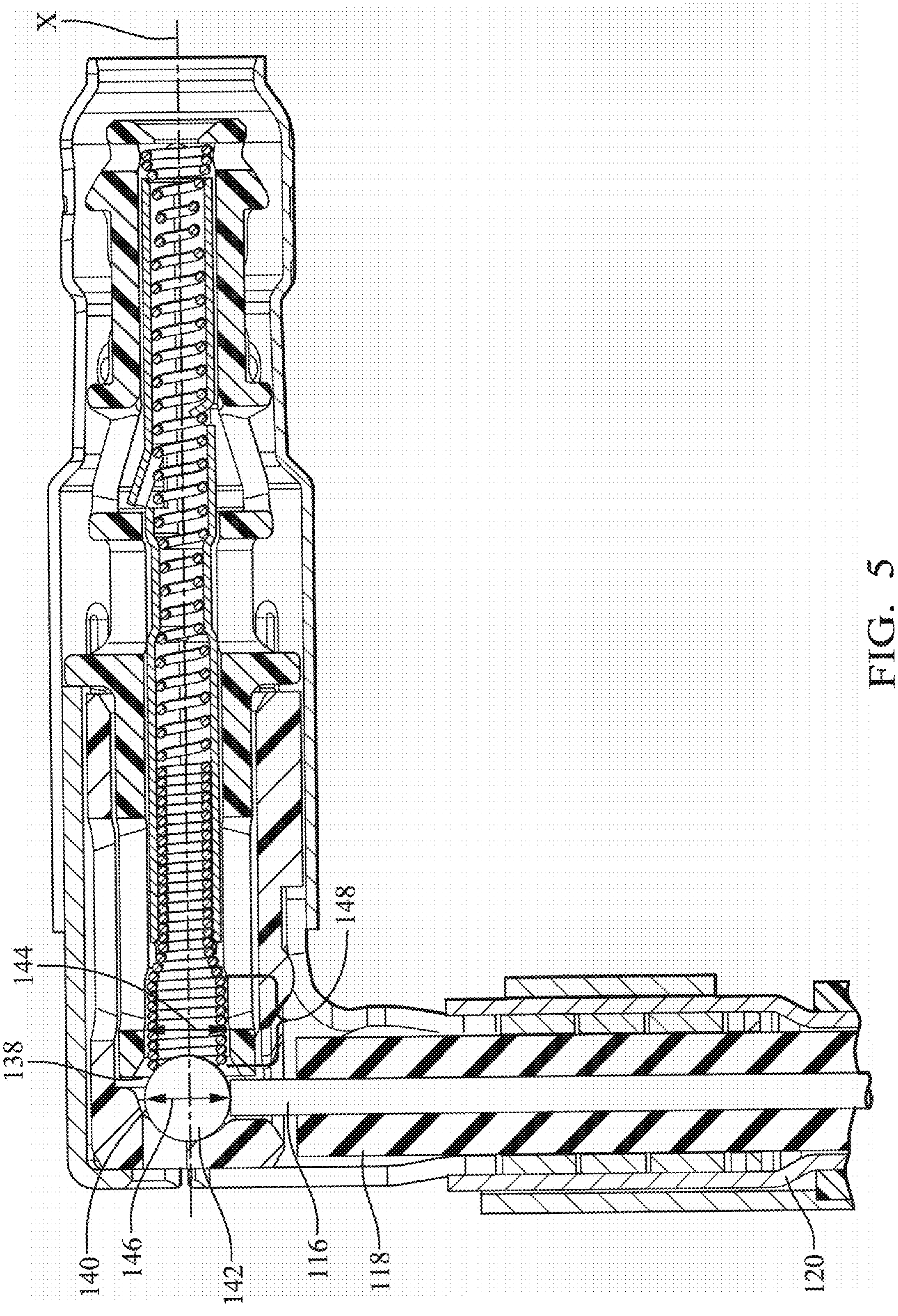
FIG. 5 shows a cross-section view of the electrical connector assembly of FIG. 1 further including an electrically conductive sphere terminating a conductor of an electrical cable according to some embodiments.
Figures 6, 7:
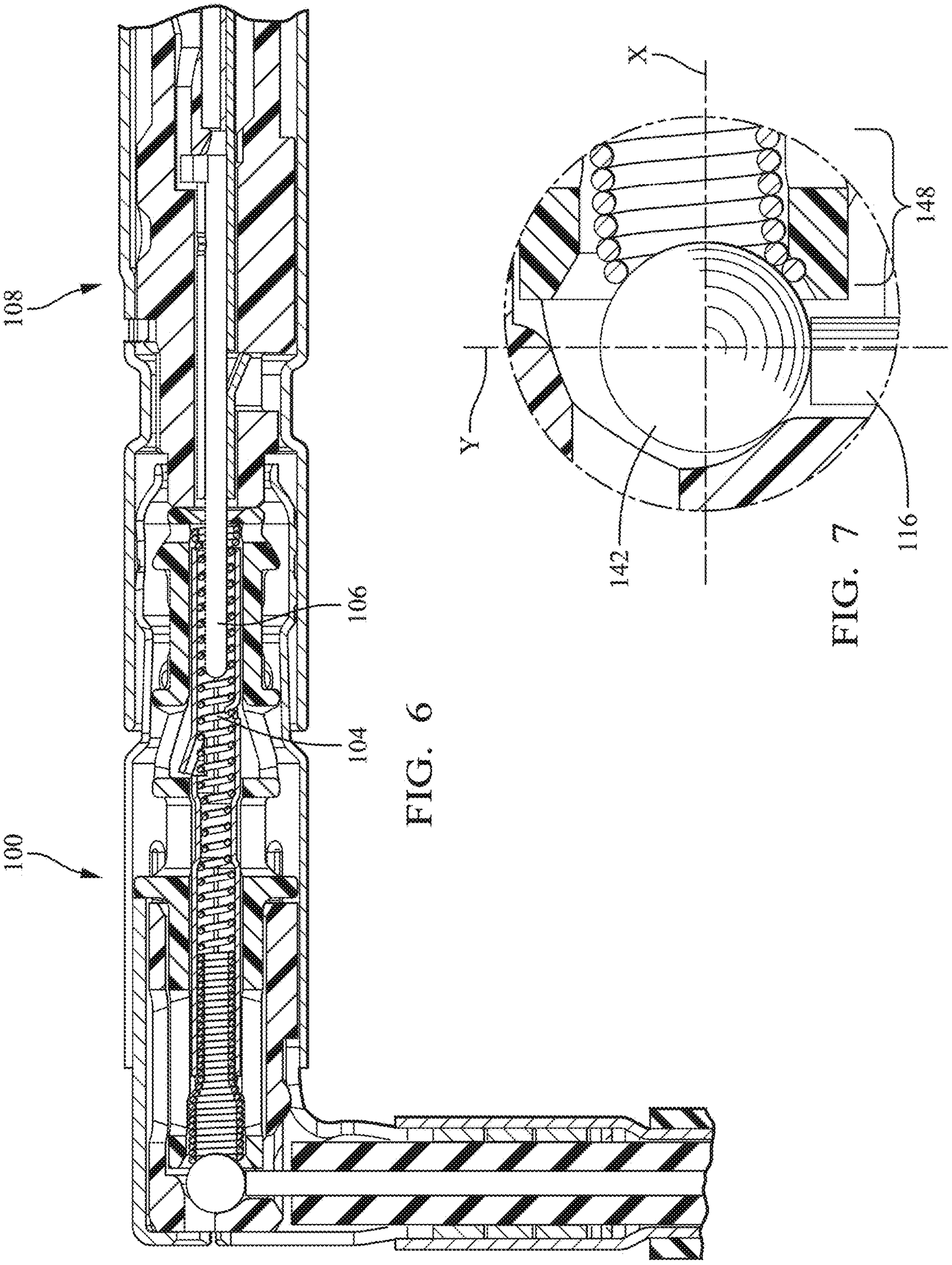
FIG. 6 shows a cross-section view of the electrical connector assembly of FIG. 1 interfacing with a corresponding electrical connector assembly including the corresponding electrical plug terminal according to some embodiments.
FIG. 7 shows a close up cross-section view of the interface between the helical coil spring of the electrical receptacle terminal of FIG. 1 and the electrically conductive sphere according to some embodiments.

A second end 138 of the coil spring 104 arranged opposite the first end 122 is in compressive mechanical and electrical contact with an electrical contact 140 connected to an end of the central conductor 116 of the coaxial cable 118. The electrical contact 140 may define a spherical sector shaped electrical contact. In alternative embodiments, the electrical contact 140 may have a flat or tubular shape. In this particular example, the spherical sector shape of the electrical contact 140 is provided by an electrically conductive ball or sphere 142 that is attached, e.g., welded, to the end of the central conductor 116. The second end 138 has a third diameter 144 that is larger than the first diameter 126 but less than a diameter 146 of the sphere 142. As shown in FIG. 5, the second end 138 presses against the sphere 142 in the longitudinal or X direction, the coil spring 104 is thereby compressed and exerts a compressive contact force between the second end 138 of the coil spring 104 and the sphere 142, thereby providing a robust electrical connection between the receptacle terminal 102 and the central conductor 116. As shown in FIG. 7, the coil spring 104 may flex in the lateral or Y direction to accommodate some longitudinal misalignment between the coil spring 104 and the sphere 142.

Returning now to FIG. 3, the coils of the coil spring 104 in a second portion 148 of the coil spring 104 located proximate the second end 138 and extending from the conductive sleeve 132 touch one another when the coil spring 104 is in a relaxed condition. This feature wherein the coils touch one another has also been found to improve the electromagnetic performance of the receptacle terminal 102.

Although the first and second ends 122, 138 of the coil spring 104 are illustrated as having a blunt cut, other embodiments of the coil spring 104 may be envisioned in which the first end 122, the second end 138, or both are flush cut.

Figure 8:
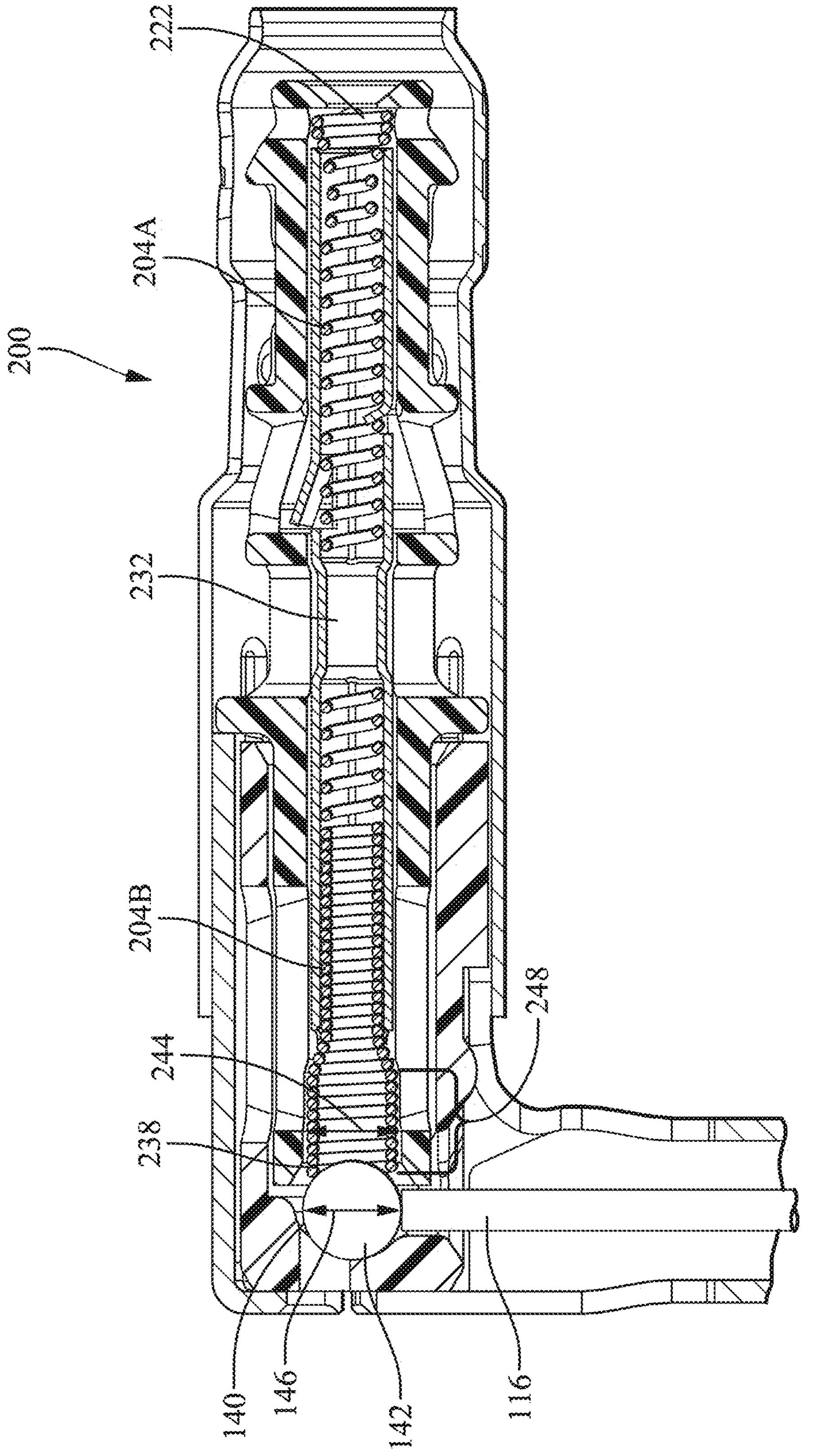
FIG. 8 shows a cross-section view of an electrical connector assembly with an electrical receptacle terminal having a first helical coil spring configured to receive a corresponding electrical plug terminal and a second helical coil spring configured to mechanically and electrically contact a spherical sector shaped electrical contact according to some embodiments.

FIG. 8 shows another non-limiting example of a right-angled electrical connector assembly, hereafter referred to as the assembly 200. In this example, which is similar to assembly 100, the coil spring is divided into two separate coil springs 204A, 204B that are electrically and mechanically connected by a conductive sleeve 232. The first coil spring 204A has a first end 222 that is configured to receive the plug terminal 106 of the mating electrical connector assembly 108 and the second coil spring 204B is configured to contact the electrical contact 140 connected to the end of the central conductor 116 of the coaxial cable 118. The coils of the second coil spring 204B in a portion 248 of the second coil spring 204B located proximate the second end 238 and extending from the conductive sleeve 232 touch one another when the second coil spring 204B is in a relaxed condition. The second end 238 is in compressive contact with the sphere 142 of the electrical contact 140. The diameter 244 of the second end 238 is less than a diameter 146 of the sphere 142. The second coil spring 204B may flex in the lateral or Y direction to accommodate some longitudinal misalignment between the second coil spring 204B and the sphere 142.

Figure 9:
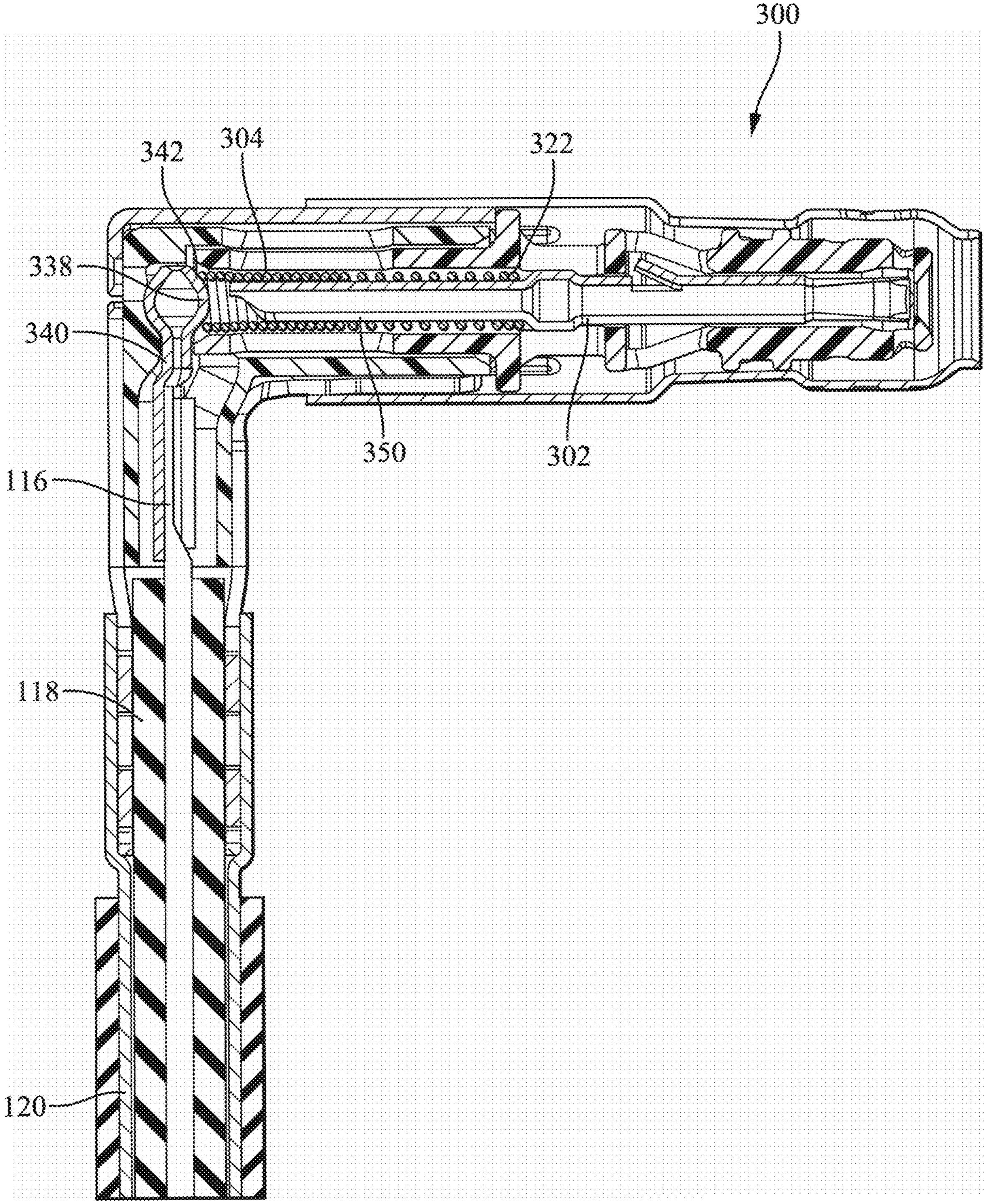
FIG. 9 shows a cross-section view of an electrical connector assembly with an electrical receptacle terminal having a helical coil spring configured to mechanically and electrically contact a spherical sector shaped electrical contact according to some embodiments.
Figure 10A:
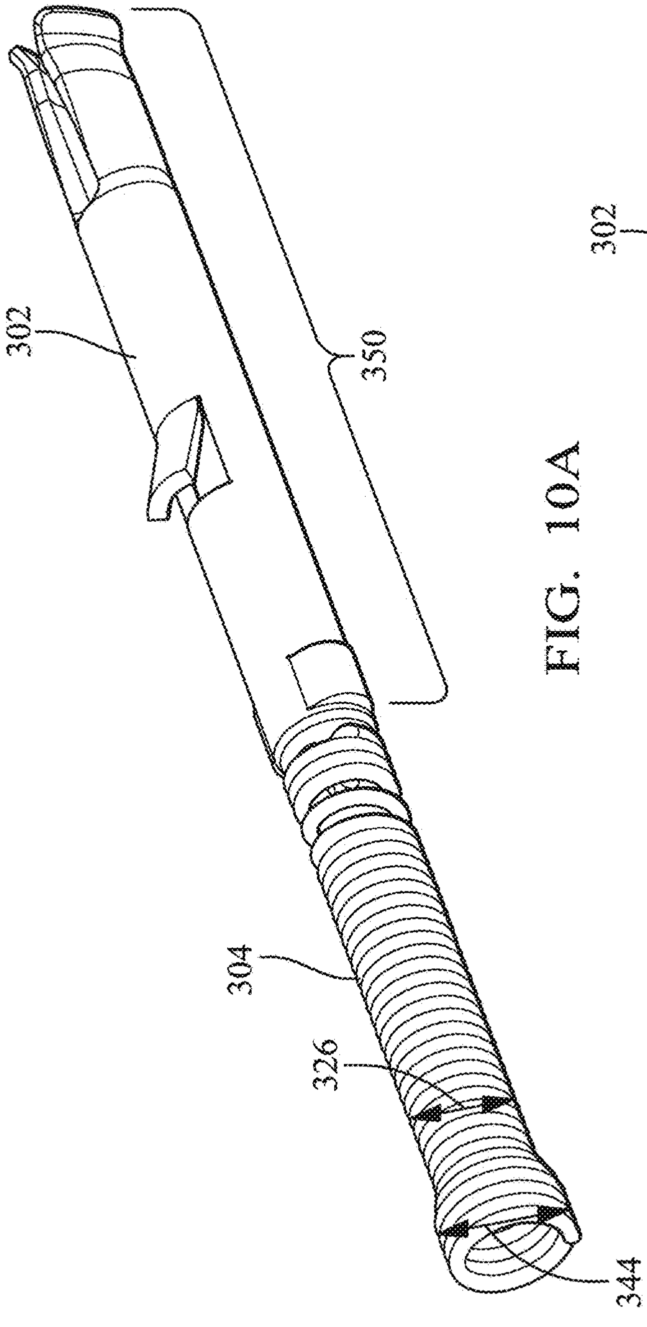
FIG. 10A shows a perspective view of the electrical receptacle terminal of FIG. 9 according to some embodiments.
Figure 10B:
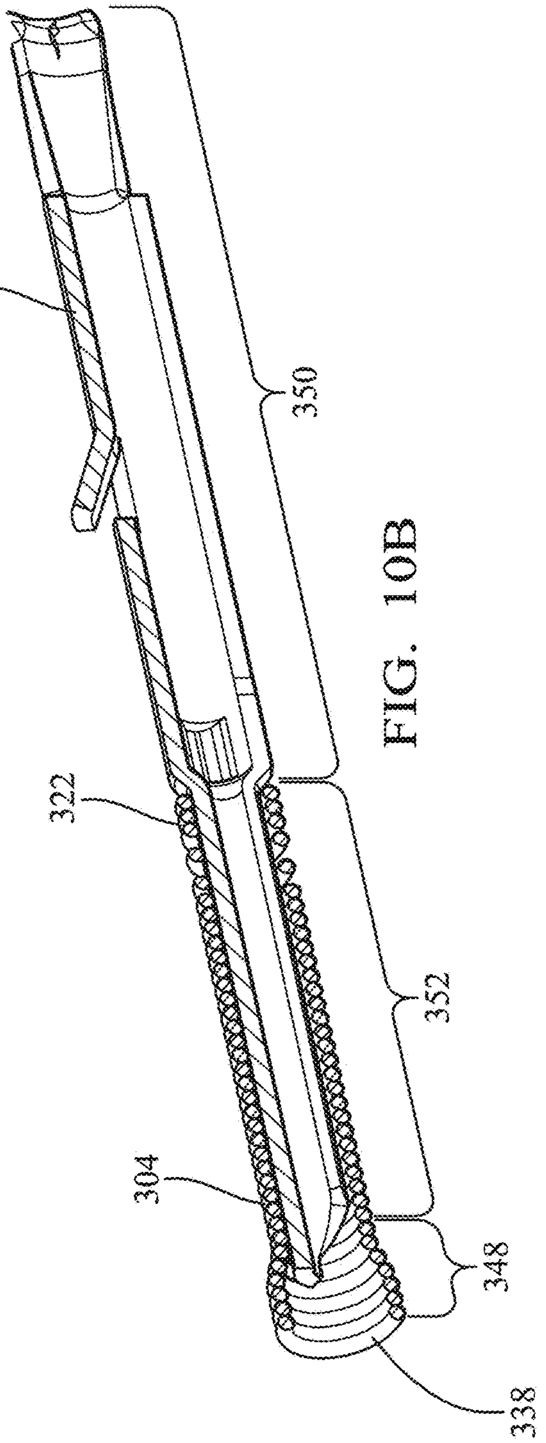
FIG. 10B shows a cross-section view of the electrical receptacle terminal of FIG. 9 according to some embodiments.
Figure 11:
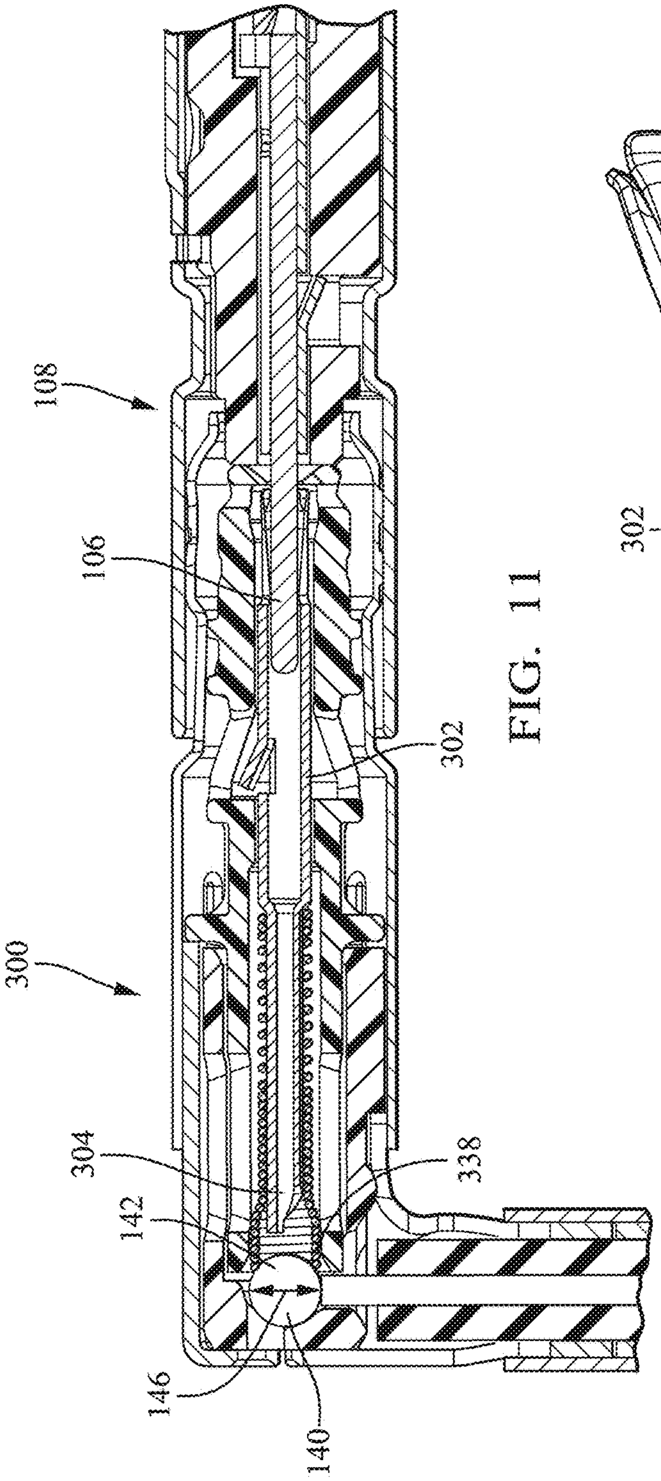
FIG. 11 shows a cross-section view of the electrical connector assembly of FIG. interfacing with a corresponding electrical connector assembly according to some embodiments.

FIGS. 9-11 show yet another non-limiting example of a right-angled electrical connector assembly, hereafter referred to as the assembly 300. In this example, which is similar to assemblies 100 and 200, the receptacle terminal 302 shown in FIGS. 10A and 10B has a conventional stamped and rolled tubular portion 350 that is configured to receive the plug terminal 106. The receptacle terminal 302 includes a coil spring 304 and a rod-like portion 352 extending from the tubular portion 350 is received in a first end 322 of the coil spring 304. The coil spring 304 extends between the first end 322 and a second end 338 opposite the first end 322. The coils of the coil spring 304 in a portion 348 of the coil spring 304 located proximate the second end 338 and extending past the rod-like portion 352 touch one another when the coil spring 304 is in a relaxed condition.

In the example illustrated in FIG. 9, the second end 338 of the coil spring 304 is in compressive contact with an electrical terminal 340 that is connected, e.g., crimped, to the end of the central conductor 116 of a coaxial cable 118. The electrical terminal 340 defines a spherical sector shaped surface 342 that is in compressive contact with the second end 338 of the coil spring 304. The portion 348 of the coil spring 304 has a diameter 344 that is larger than a diameter 326 of the rest of the coil spring 304 but less than a diameter 146 of the spherical sector shaped surface 342. In an alternative example illustrated in in FIG. 11, the second end 338 of the coil spring 304 is in compressive contact with the sphere 142 of the electrical contact 140 that is connected, e.g., welded, to the end of the central conductor 116 of a coaxial cable 118.

Figure 12:
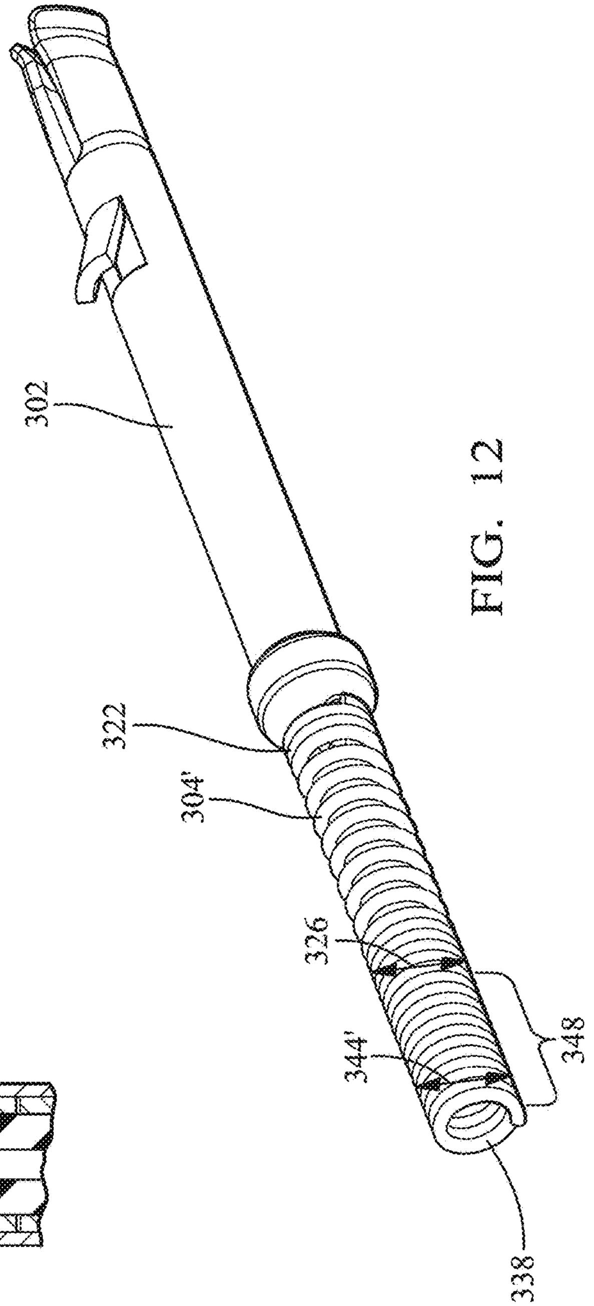
FIG. 12 shows a perspective view of an electrical receptacle terminal according to some embodiments.

FIG. 12 shows an alternative coil spring 304' in which the portion 348 of the coil spring 304' has a diameter 344' that is generally the same as a diameter 326 of the rest of the coil spring 304'.

The coil spring 304 or 304' may flex in the lateral or Y direction to accommodate some longitudinal misalignment between the coil spring 304 or 304' and the sphere 142 or spherical sector shaped surface 342.

Other embodiments may be envisioned in which the conductive sphere 142 welded to the central conductor 116 and the electrical terminal 340 that is crimped to the central conductor 116 are interchanged.

While the illustrated examples are right angled electrical connectors, alternative embodiments may be envisioned for straight electrical connectors or other non-perpendicular arrangements between the plug terminal and the electrical cable. In addition, other alternative embodiments of electrical connector assemblies employed in other receptacle terminal-plug terminal configurations may also be envisioned.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

an electrical receptacle terminal having a helical coil spring configured to receive a corresponding electrical plug terminal therein; and an insulative housing having a cavity in which the receptacle terminal is disposed, an end of the coil spring being in compressive mechanical contact with a cable terminal attached to an end of a conductor of an electrical cable, said cable terminal defining a spherical sector shaped electrical contact in compressive mechanical contact with the electrical receptacle terminal.

2. The electrical connector assembly according to claim 1, wherein another end of the coil spring has a first portion of the coil spring that is configured to receive the electrical plug terminal and provide a plurality of electrical contact points between the coil spring and the electrical plug terminal.

3. The electrical connector assembly according to claim 1, wherein a diameter of coils of the coil spring in the first portion of the coil spring is less than a diameter of coils in the coil spring at the another end.

4. The electrical connector assembly according to claim 1, wherein a longitudinal axis of the electrical cable is arranged generally perpendicularly to a longitudinal axis of the coil spring.

5. The electrical connector assembly according to claim 1, wherein a first portion of the coil spring is contained within an electrically conductive sleeve at least partially radially surrounding the coil spring.

6. The electrical connector assembly according to claim 5, wherein the electrically conductive sleeve defines a tab feature configured to retain the electrically conductive sleeve and the coil spring within the cavity.

7. The electrical connector assembly according to claim 5, wherein the coil spring is a first coil spring, wherein the electrical connector assembly further comprises a second coil spring partially disposed within the electrically conductive sleeve and in compressive mechanical contact with a cable terminal attached to an end of a conductor of an electrical cable.

8. The electrical connector assembly according to claim 7, wherein coils of the second coil spring outside of the electrically conductive sleeve are touching one another when the coil spring is in a relaxed condition.

9. An electrical connector assembly comprising:

an electrical receptacle terminal having a helical coil spring configured to receive a corresponding electrical plug terminal therein, a first portion of the coil spring being contained within an electrically conductive sleeve at least partially radially surrounding the coil spring and coils of the coil spring in a second portion of the coil spring outside of the electrically conductive sleeve are touching one another when the coil spring is in a relaxed condition; and an insulative housing having a cavity in which the receptacle terminal is disposed.

10. An electrical connector assembly, comprising:

an electrical receptacle terminal configured to receive a corresponding electrical plug terminal therein;

a cable terminal attached to an end of a conductor of an electrical cable;

a coil spring having a first end attached to the electrical receptacle terminal and a second end in compressive mechanical contact with a spherical sector shaped electrical contact of the cable terminal; and an insulative housing having a cavity in which the receptacle terminal and coil spring are disposed.

11. The electrical connector assembly according to claim 10, wherein coils of the coil spring located proximate the second end are touching one another when the coil spring is in a relaxed condition.

12. The electrical connector assembly according to claim 10, wherein a portion of the receptacle terminal is disposed within a first portion of the coil spring and wherein coils of the coil spring in a second portion of the coil spring in which the electrical receptacle terminal is not disposed are touching one another when the coil spring is in a relaxed condition.

13. The electrical connector assembly according to claim 12, wherein the portion of the electrical receptacle terminal received within the coil spring is rod-shaped.

14. The electrical connector assembly according to claim 10, wherein the cable terminal is an electrically conductive sphere attached to the end of a conductor of an electrical cable.

15. The electrical connector assembly according to claim 10, wherein the first end of the coil spring is in compressive contact with a rod-shaped portion of the electrical receptacle terminal.

* * * * *